Aug. 13, 1963 C. J. BAKER 3,100,323
CABLE COUPLER
Filed April 18, 1961 2 Sheets-Sheet 1

Charles J. Baker
INVENTOR.

BY *Eugene R. Farley*

*Atty.*

Aug. 13, 1963 C. J. BAKER 3,100,323
CABLE COUPLER
Filed April 18, 1961 2 Sheets-Sheet 2

Charles J. Baker
INVENTOR.

BY Eugene S. Farley
Atty.

United States Patent Office 3,100,323
Patented Aug. 13, 1963

3,100,323
CABLE COUPLER
Charles J. Baker, Dallas, Oreg., assignor to The Skookum Company, Inc., Portland, Oreg., a corporation of Oregon
Filed Apr. 18, 1961, Ser. No. 103,834
3 Claims. (Cl. 24—123)

This invention relates to couplers for the end-to-end uniting of lengths of cables, chains, and the like.

Situations often arise in which it is desirable or necessary to couple together two or more lengths of cable, end-to-end. This is true, for example, when it is desired to splice together short lengths of cable into a longer length. It is particularly true in the logging industry where it frequently is desirable to employ a short, easily manipulated length of cable for anchoring about a stump or other fixed object the long and heavy guy line used to brace the spar tree or pole employed for yarding the logs.

Accordingly it is the general object of this invention to provide a coupler for cables and the like which may be employed to couple the cables together securely but releasably, and which is characterized by being:

(1) Fast and easy to use.
(2) Simple in construction, comprising but a single piece.
(3) Lightweight so that it does not sag guy lines in which it is included.
(4) Inexpensive.

The manner in which the foregoing and other objects of this invention are accomplished will be apparent from the accompanying specification and claims considered together with the drawings, wherein:

Figure 1:
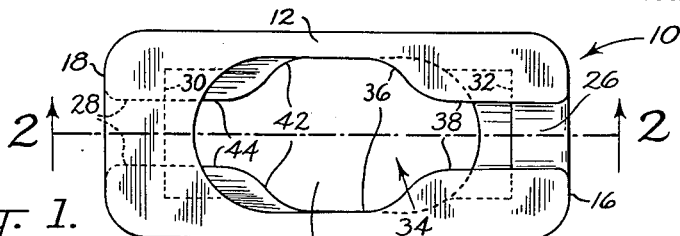
FIG. 1 is a plan view of the herein described cable coupler in a first embodiment.
Figure 3:
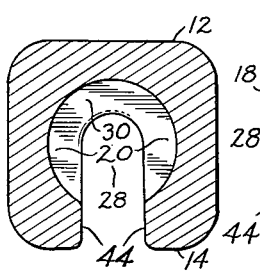
FIG. 3 is a transverse sectional view taken along line 3—3 of FIG. 2.
Figure 2:
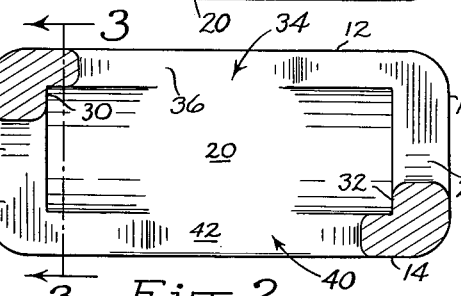
FIG. 2 is a longitudinal sectional view taken along line 2—2 of FIG. 1.

The cable coupler of the present invention is used for joining cables having ferruled ends. Generally stated, it comprises a body having opposite sides and ends and a central chamber dimensioned to contain two of the ferruled cable ends, placed end-to-end. Openings extend through each of the opposite ends and communicate with the chamber. The openings are dimensioned to pass the cables, but not their ferruled ends. Ferrule abutment surfaces are present at the ends of the chamber adjacent the end openings. Slots extend through the two opposite sides of the body and communicate with the chamber. Both slots have segments dimensioned to pass the cable ferruled ends, and the slots on at least one side merge with at least one of the end openings.

Considering the foregoing in greater detail and with particular reference to the drawings:

In the form of the invention illustrated in FIGS. 1–7, the presently described coupler comprises a light but strong body 10 having opposite sides 12, 14 and opposite ends 16, 18. Within the body is a chamber 20 which may be slightly tapered toward each end, the smaller diameter being at the end. The chamber preferably has a length which is slightly more than double the length of the ferruled ends 22 of cables 24 which it is designed to receive.

Ends 16, 18 of the body are provided with openings 26, 28, respectively, dimensioned to pass the cables, but not the ferruled ends thereof.

Abutments 30, 32 are present at each end of chamber 20 adjacent the end openings. These present a surface against which the inner ends of the ferrules bear during use of the coupler.

Figure 4:
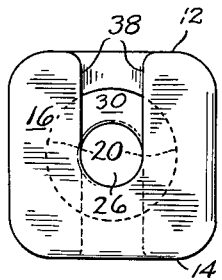
FIG. 4 is an end view.

Side 12 of the body is provided with a slot 34 which extends part of the length of the coupler and communicates with chamber 20. The central portion 36 of the slot is enlarged sufficiently to pass ferrule 22. The end segment 38 of the slot is restricted to pass cable 24 but not the ferrule. Also, it merges with end opening 26 as shown in FIG. 4. The opposite side 14 of the body is provided with a slot 40 which extends longitudinally in the reverse direction from slot 34. It consists of a central, enlarged portion 42 slightly offset from enlarged portion 36 of slot 34, and a restricted terminal portion 44. Central portion 42 is sufficiently large to receive ferrule 22. However, terminal section 44 is restricted so that it will not receive the ferrule, but will receive the cable. In addition, it merges with end opening 28 in the manner shown in FIG. 3.

Figure 5:
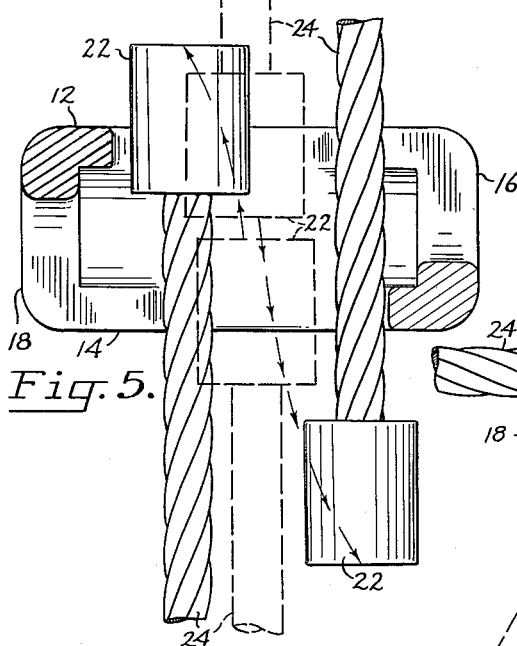
FIGS. 5, 6 and 7 are sectional views similar to FIG. 2 illustrating the steps used in applying the coupler.
Figure 6:
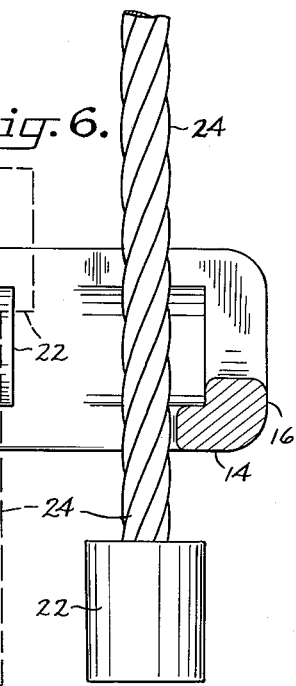
Figure 7:
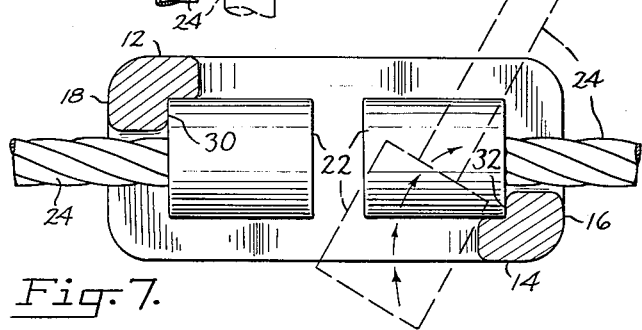

The manner of use of the coupling of FIGS. 1–4 is illustrated stepwise in FIGS. 5–7. First the ferruled end of the right hand cable is inserted, as indicated in its dotted outline position, into the central enlarged segment 36 of slot 34. The cable is moved longitudinally, passing the ferrule through enlarged portion 42 of slot 40 in the opposite side of the coupler body, and then moved laterally until the full line position of the cable is reached.

Next, the ferrule on the left hand cable is passed through the enlarged central segment 42 of slot 40 in side 14 of the coupler as indicated by the dotted line position of FIG. 5. The cable next is moved until it reaches its full line position, extending outwardly through the enlarged section 36 of slot 34.

When in this position, the left hand cable may be swung from the dotted to the full line position of FIG. 6.

Also, the right hand cable may be retracted and rotated from the dotted to the full line position of FIG. 7.

Both cables thus are locked securely within the body of the coupler with the ferrules bearing respectively against abutments 30, 32. They are prevented from becoming uncoupled inadvertently by the restricted clearance of the slots and end openings, as well as by the restricted distance between their opposed ends. However, they may be uncoupled readily by reversing the sequence of steps by which they have been coupled.

Another form of the invention is illustrated in FIGS. 8–13. In this embodiment, the coupler comprises a body 50 having opposite sides 52, 54 and opposite ends 56, 58.

Within the body is an elongated chamber 60 which may taper slightly toward its extremities to accommodate the ferruled ends 62 of cables 64.

End 56 of the body is provided with a central opening 66 and end 58 with a corresponding opening 68. These communicate with chamber 60 and are dimensioned to pass cables 64, but not their ferruled ends 62. The end walls of chamber 60 provide abutments 70, 72 against which the inner ends of ferrules 62 bear when the coupling is in use.

Through side 52 of the body is a longitudinal slot 74 which communicates with chamber 60. The central portion 76 of the slot is enlarged sufficiently to pass the ferruled ends of the cables. The end segments 78, 80 of the slot, however, are of restricted width so that, although they will pass the cables, they will not pass the ferruled ends. They merge respectively with end openings 66, 68.

Through side 54 of the body, opposite slot 74, is a central slot 82 which is closed at its ends, but of sufficient width to clear the ferrules on the cables.

Figure 12:
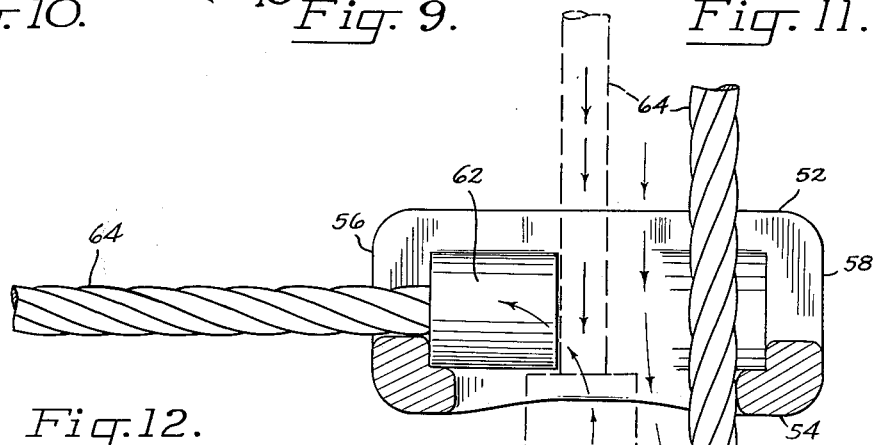
FIGS. 12 and 13 are longitudinal sectional views similar to FIG. 9 and illustrating the manner of application of the coupler of FIGS. 8–11.
Figure 13:
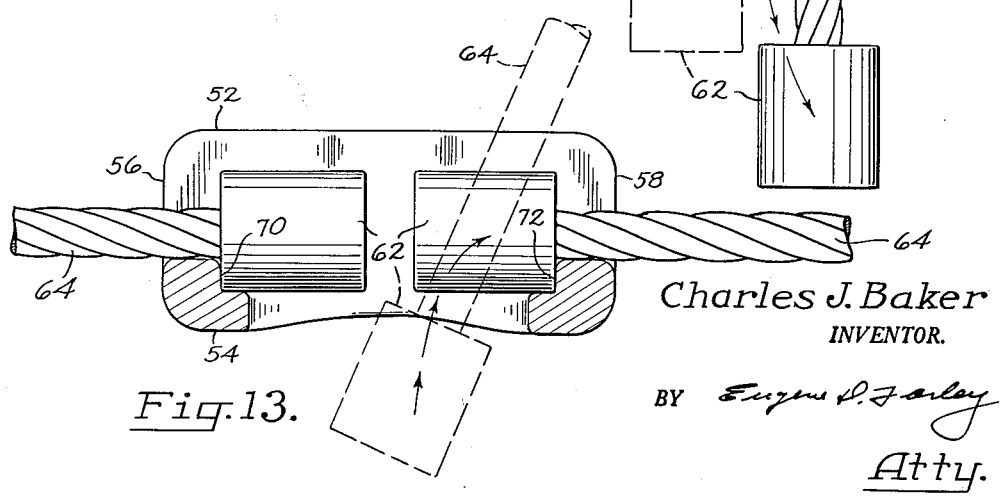

The manner of application of the coupler illustrated in FIGS. 8-11 is shown stepwise in FIGS. 12, 13.

First, as shown in FIG. 12, the right hand cable is inserted completely through central opening 76 in side 52 and through central opening 82 in side 54. The left hand cable may be inserted in its dotted line position through enlarged section 76 of slot 74 in side 52, and at least partway through enlarged slot 82 in side 54.

Next, the left hand cable may be moved to its full line position of FIG. 12, the cable passing through the restricted portion 78 of slot 74 until it is received in end opening 66.

Next, the right hand cable is moved from the dotted line position of FIG. 13 to the full line position. This requires retracting it while contemporaneously rotating it and passing the cable through restricted segment 80 of slot 74 until it is received in end opening 68.

The result of the foregoing manipulations is to couple the cables securely together with the ferruled ends opposed to each other, but separated by a restricted distance. As a consequence, it is not possible to uncouple them inadvertently during use. However, when it is desired to disconnect them, the sequence of steps described above easily may be reversed.

Figure 8:
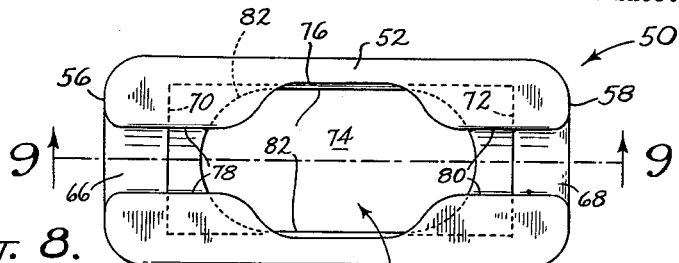
FIG. 8 is a plan view similar to FIG. 1 but illustrating the herein described cable coupler in a second embodiment.
Figure 10:
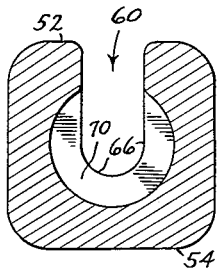
FIG. 10 is a transverse sectional view taken along line 10—10 of FIG. 9.
Figure 9:
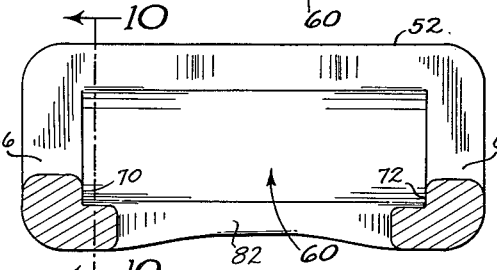
FIG. 9 is a longitudinal sectional view taken along line 9—9 of FIG. 8.
Figure 11:
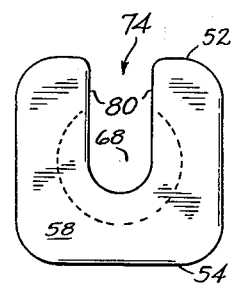
FIG. 11 is an end view.

It will be apparent from the drawings that the enlarged slot portions 36 and 42 in the FIG. 1 embodiment and the enlarged slot 82 of the FIG. 8 embodiment terminate inwardly relative to the end abutments for the ferruled cable ends whereby a portion of the length of the ferruled cable ends adjacent the abutments is confined by wall portions, except at the cable receiving slots, throughout its circumferential dimension. Thus, even though the cables are slackened, the ferruled ends thereof are not capable of rotating laterally out of engagement with the coupler since the confining wall portions prevent such rotation.

It is to be understood that the forms of my invention herein shown and described are to be taken as preferred examples of the same and that various other changes in the shape, size and arrangement of parts may be resorted to without departing from the spirit of my invention or the scope of the subjoined claims.

Having thus described my invention, I claim:

1. A coupler for joining ferruled cable ends which comprises an elongated body having a central longitudinal chamber therein and opposite longitudinal end openings communicating therewith, the central chamber being dimensioned to receive two ferruled cable ends arranged end to end, the end openings being dimensioned to receive the cables but not the ferruled ends thereof, the ends of the chamber forming abutments for the cable ferrules, the body having a pair of diametrically opposed transverse slots therein forming a central transverse opening through the body communicating with the chamber and a pair of transverse end openings one communicating with each of the longitudinal end openings, the central transverse opening being dimensioned to pass the cable ferrules therethrough and to terminate at its longitudinal ends inward of the abutment ends of the chamber, the transverse end openings being dimensioned to pass the cables therethrough but not the ferruled ends thereof and to terminate inward of the abutment ends of the chamber, whereby the outer end portions of the chamber form sockets which confine the corresponding end portions of the cable ferrules substantially throughout their circumferential dimensions.

2. The coupler of claim 1 wherein each of the pair of transverse slots includes an inner length dimensioned to pass the cable ferrule therethrough and an outer length dimensioned to pass the cable therethrough but not the ferruled end thereof.

3. The coupler of claim 1 wherein one of the pair of transverse slots terminates at its opposite ends inward of the opposite abutment ends of the chamber, and the other transverse slot includes a central portion dimensioned to pass the cable ferrules therethrough and opposite end portions dimensioned to pass the cables therethrough but not the ferruled ends thereof.

References Cited in the file of this patent

UNITED STATES PATENTS

| | | |
|---|---|---|
| 1,685,473 | Wirkkala | Sept. 25, 1928 |
| 1,694,051 | Bardon | Dec. 4, 1928 |
| 2,215,023 | White | Sept. 17, 1940 |
| 2,234,602 | McIntosh | Mar. 11, 1941 |
| 2,828,519 | Berg | Apr. 1, 1958 |
| 2,872,716 | Ehmann et al. | Feb. 10, 1959 |